United States Patent [19]

Kellum et al.

[11] 3,923,767

[45] Dec. 2, 1975

[54] ETHYLENE POLYMERIZATION PROCESS IN THE PRESENCE OF QUINONE ALKIDES

[75] Inventors: Gene E. Kellum; Ronald E. Gilbert, both of Orange, Tex.

[73] Assignee: Gulf Research & Development Company, Pittsburgh, Pa.

[22] Filed: Aug. 22, 1974

[21] Appl. No.: 499,398

[52] U.S. Cl.......................... 260/94.9 R; 260/396 N
[51] Int. Cl.².C08F 110/02; C07C 49/62; C07C 97/18
[58] Field of Search.................... 260/94.9 R, 396 N

[56] References Cited
UNITED STATES PATENTS

| | | | |
|---|---|---|---|
| 2,566,537 | 9/1951 | Schmerling | 260/94.9 R |
| 2,891,936 | 6/1959 | Guillet et al. | 260/94.9 R |
| 3,349,072 | 10/1967 | Alexander et al. | 260/94.9 R |
| 3,660,505 | 5/1972 | Starnes | 260/396 N |
| 3,796,696 | 3/1974 | Brown | 260/87.3 |

Primary Examiner—Joseph L. Schofer
Assistant Examiner—Herbert J. Lilling

[57] ABSTRACT

A process for polymerizing ethylene is provided in which very small concentrations of a quinone alkide, such as 3,5-ditertiarybutyl-p-quinone methide, are employed in the reaction medium. The quinone alkide modifies the properties of the resulting polymers, particularly by providing both improved strength and optical properties.

3 Claims, No Drawings

ETHYLENE POLYMERIZATION PROCESS IN THE PRESENCE OF QUINONE ALKIDES

BACKGROUND OF THE INVENTION

In the continuous mass process for the polymerization of ethylene, the ethylene polymers that are obtained are not completely transparent when fabricated into film. The lack of transparency in such ethylene polymers is an undesired shortcoming of such polymers.

U.S. Pat. No. 3,349,072 discloses that the transparency and other optical properties of ethylene polymers can be improved, if the ethylene polymerization is carried out under carefully controlled conditions and certain polymerization inhibitors are introduced into the polymerization zone. While this process does have a number of recognized advantages, it also has a number of shortcomings. Specifically, the addition of a polymerization inhibitor to the polymerization zone destroys a portion of the free-radical polymerization initiator added to the reaction zone and materially reduces the yield of polymer obtained per unit of the polymerization initiator added to the reactor.

The preferred polymerization inhibitors disclosed in U.S. Pat. No. 3,349,072 are the so-called hindered phenols, such as 2,6-ditertiarybutyl-4-methyl phenol. For reasons which are not fully understood, ethylene polymers prepared in the presence of such hindered phenols tend to discolor upon aging, particularly where the resins are exposed to sunlight and other forms of acitinic or ionizing radiation.

Where hindered phenols are employed in the polymerization of ethylene, they typically are employed at a level of about 500 ppm per part of ethylene monomer charged to the polymerization zone. The hindered phenols typically are added to the polymerization zone as a solution in a liquid hydrocarbon, such as hexane. The incorporation of the required quantity of the hindered phenol incorporates such a corresponding high level of hexane into the reaction system that a significant burden is placed upon the purification section of the process in which the recycle ethylene gas is treated to remove inert gases and other materials from the ethylene.

SUMMARY OF THE INVENTION

It has now been discovered that ethylene polymers of excellent optical properties can be prepared in a conventional continuous mass process for the polymerization of ethylene by adding to the polymerization zone very minor quantities of a quinone alkide having the formula:

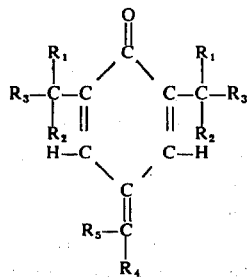

where $R_1$ and $R_2$ are alkyl groups, $R_3$ is an alkyl group or an aryl group, and $R_4$ and $R_5$ are hydrogen or an alkyl group.

DETAILED DESCRIPTION OF THE INVENTION

The process of the present invention is carried out in a conventional manner, except that a quinone alkide, preferably 3,5-ditertiarybutyl-p-quinone methide or 3,5-ditertiarybutyl-p-quinone ethide is added to the polymerization zone in the amount of about 0.5 to 30 and preferably about 1–10 parts per million parts of ethylene charged to the reaction zone. The process of the invention can be carried out in any type of reactor conventionally employed for a continuous mass ethylene polymerization process such as a stirred autoclave reactor or a tubular reactor.

Before start up of the process of the invention, it is highly desirable to clean the reactor rigorously free of accumulated resin particles which may have built up on any of the internal surfaces of the polymerization vessel. The presence of such accumulated resin particles in some manner appears to promote the production of highly cross-linked ethylene polymers which are incompatible with the bulk of the ethylene polymer produced in the reaction. Such cross-linked ethylene polymers have a deleterious effect upon the optical properties of the ethylene polymer being produced.

The reaction temperature and the reaction pressure employed in the process of the invention will fall within the range of temperatures and pressures customarily employed in the continuous mass polymerization of ethylene. When the reaction is carried out in a stirred autoclave, the pressures employed normally will be within the range of about 16,000 to about 28,000 psig, although higher or lower pressures may be employed. The temperatures empolyed in a stirred autoclave process will depend somewhat upon the polymerization initiator employed, but normally it is preferred to operate the process at temperatures in the range of about 200° to 550°F., and preferably about 275° to 510°F. In the operation of the process, in a stirred autoclave reactor, the free-radical generating initiator employed will depend on the reaction temperature. For example, it is often desirable to partition an autoclave into a number of zones by means of baffles and the like, such that the temperature in each zone can be maintained at different levels. The free-radical generating initiator is then chosen to maintain the desired degree of reaction in each zone depending on the temperature in that zone. Thus, in a zone operating at 300° – 350°F. (149° – 177°C.) initiators having a 10 hour half-life temperature in the range of about 35° – 70°C. are useful. Suitable initiators in this range include decanoyl peroxide, t-butyl perneodecanoate, hexyl peroxydicarbonate, n-propyl peroxydicarbonate and t-butyl peroxypivalate. For use in a zone operating at 420° – 500°F. (215° – 260°C.), initiators having higher 10 hour half-life temperatures, in the range of approximately 90° –130°C. may be utilized. Suitable materials include t-butyl perbenzoate, di-t-butyl peroxide, t-butyl peracetate and t-butyl percrotonate.

The quinone alkides of the invention can be prepared by appropriate synthesis from 2,4,6-trialkyl phenols in which the alkyl group in the 2 and 6 positions will be attached to the ring through a tertiary carbon atom. The alkyl group attached to the 4 position will be attached to the ring through either a secondary carbon atom or preferably a primary carbon atom. Typically, the alkyl groups in the 2 and 6 positions will be tertiarybutyl groups although other groups can be present in this position such as the groups obtained by condensing 2 mols of α-methylstyrene with paracresol. The alkyl group present in the 4 position preferably will be a methyl group or an ethyl group.

One method for preparing 3,5-ditertiarybutyl-p-quinone methide is to brominate the hindered phenol in a water-acetic acid medium as shown in Reaction A to produce Intermediate (I).

(A) 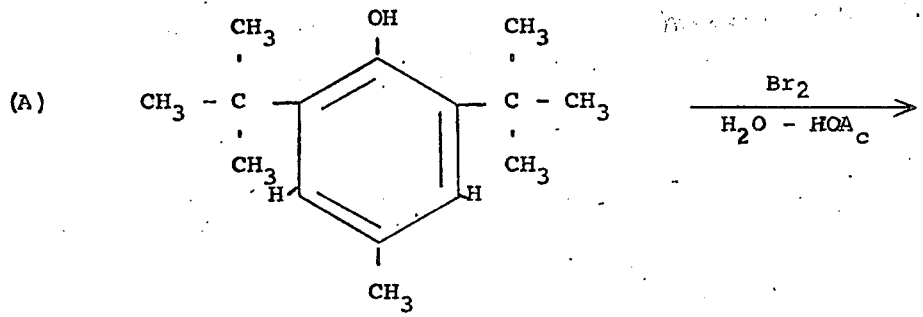

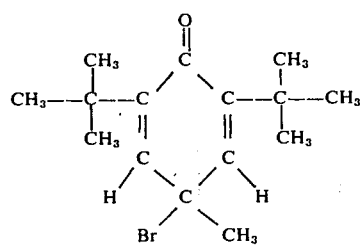

Intermediate (II) can be converted to 3,5-ditertiarybutyl-p-quinone methide (III) by reaction with a dehydrohalogenating agent such as triethylamine at room temperature in a hydrocarbon medium as set forth in Reaction C.

The triethylamine hydrogen bromide salt formed in Reaction C can be readily filtered and the solution of the 3,5-ditertiarybutyl-p-quinone methide (III) obtained is in a suitable form for use in the practice of the invention.

(C) 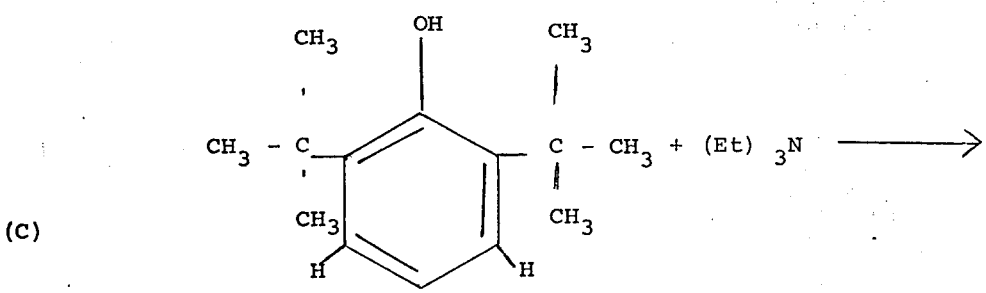

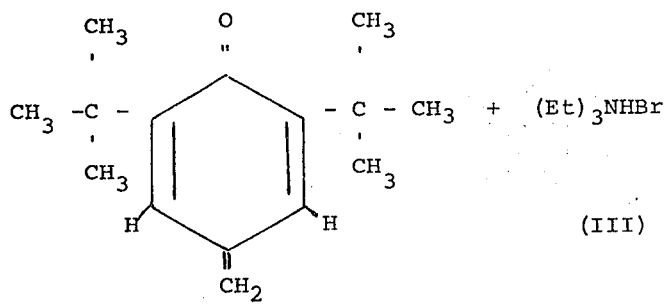

Intermediate (I), when heated to a temperature of the order of 100°–110°C., undergoes rearrangement as shown in Reaction B to provide Intermediate (II).

(B) 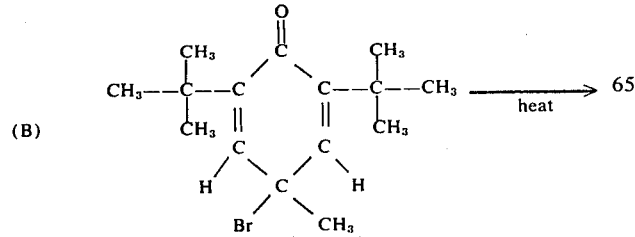

3,5-ditertiarybutyl-p-quinone ethide can be prepared from 2,6-ditertiarybutyl-4-ethylphenol. A 5–10% solution of 2,6-ditertiarybutyl-4-ethylphenol is an anhydrous low boiling hydrocarbon solvent such as hexane is passed through a column of lead dioxide. The effluent from the reaction is heated, optionally under reduced pressure, to evaporate the solvent, and the desired 3,5-ditertiarybutyl-p-quinone ethide (IV) is recovered as a yellow crystalline material having a melting point of approximately 91°C. The overall synthesis is shown in Reaction D.

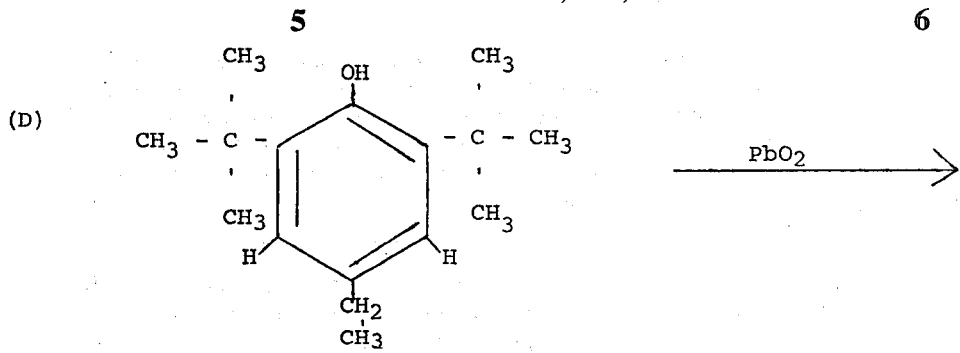

In Reaction D set forth above, it is believed that 2 mols of the starting 2,6-ditertiarybutyl-4-ethylphenol form 2 mols of an intermediate product which then undergoes decomposition and/or rearrangement to provide 1 mol of product (IV) and 1 mol of the starting 2,6-ditertiarybutyl-4-ethylphenol.

The following examples are set forth to illustrate more clearly the principle and practice of this invention to those skilled in the art.

EXAMPLE 1

This example illustrates the preparation of 3,5-ditertiarybutyl-p-quinone methide. 150 grams (0.68 mol) of 2,6-ditertiarybutyl-4-methylphenol and 1,200 ml. of glacial acetic acid were placed in a large beaker fitted with a stirrer. Over a period of 10 minutes, a solution prepared from 1076 grams (13.5 mol) of bromine, 650 ml. of glacial acetic acid, and 450 ml. of water, was added to the beaker while providng vigorous stirring. Stirring was continued for an additional four minutes after all of the bromine solution had been added to the reactor. A crystalline product was formed and was recovered by filtration. After air drying, the solids were recrystallized from petroleum ether to obtain a light yellow solid which melted at 92°–93°C. Analysis of the solid by infrared spectroscopy and nuclear magnetic resonance established that the solid material was 2,6-ditertiarybutyl-4-bromo-4-methylcyclohexa-2,5-dien-1-one which corresponds to intermediate (I) discussed earlier herein.

Intermediate (I) prepared above was heated in a vacuum oven at 100°–110°C. for 30 minutes. The material then was allowed to cool in a nitrogen-filled desiccator. An aliquot of the material was recrystallized from petroleum ether and analyzed by infrared spectroscopy and nuclear magnetic resonance. These analyses indicated that the material was 2,6-ditertiarybutyl-4-bromomethylphenol which corresponds to intermediate (II) discussed earlier herein.

A dilute solution of triethylamine was prepared in rigorously anhydrous n-hexane and placed in a dry box. A stream of dry nitrogen was fed into the dry box to maintain a rigorously inert and anhydrous environment. An equimolar quantity of intermediate (II) was dissolved in anhydrous n-hexane and placed in the dry box. The amine solution was then slowly added to the solution of intermediate (II). A precipitate was formed which was triethylamine hydrobromide. The precipitate was filtered and the filtrate consisted of a solution of 3,5-ditertiarybutyl-p-quinone methide (III). This solution was stored under rigorously anhydrous conditions and in an inert nitrogen environment for subsequent use.

EXAMPLE 2

This example illustrates the preparation of 3,5-ditertiarybutyl-p-quinone ethide. Lead dioxide (575 grams) was slurried with 575 grams of fine sand in n-hexane and the mixture was used to pack a 4.1 cm. diameter column which served as a reaction vessel. A pressure vessel attached to the inlet of the column was filled with a solution prepared by dissolving 450 grams of 2,6-ditertiarybutyl-4-ethylphenol in 9 liters of anhydrous hexane. The pressure vessel was placed under a pressure of 40 psig to force the phenol solution through the column. The rate of flow of the solution through the column was approximately 100 ml./min.

Analysis of the product obtained indicated that approximately 55 percent of the 2,6-ditertiarybutyl-4-ethylphenol was converted to the desired 3,5-ditertiarybutyl-p-quinone ethide. The entire reaction mixture was then passed through the column a second time and the conversion of the 2,6-ditertiarybutyl-4-ethylphenol to the desired 3,5-ditertiarybutyl-p-quinone ethide was approximately 85 percent.

The solution obtained above was treated to evaporate the hexane solvent by passing a stream of nitrogen over the surface of the solution. As the volume of the solution was reduced by the evaporation of solvent, a crystalline precipitate formed in the reaction mixture. The solid product, after recrystallization from hexane, had a melting point of about 91°–92°C. Analysis by infrared spectroscopy and nuclear reconance indicated that the product was 3,5-ditertiarybutyl-p-quinone ethide (IV).

EXAMPLE 3

Parallel experiments to polymerize ethylene at a pressure of 18,000 psi and a polymerization temperature in the range of 325°–480°F. were carried out to illustrate the effect that 3,5-ditertiarybutyl-p-quinone ethide has on the properties of ethylene homopolymers produced under these reaction conditions.

The polymerizations were carried out in a continuous stirred autoclave reactor whose reaction vessel had a volumetric capacity of 603 in.$^3$ (9.88 l.) and a length to diameter ratio of 12.

The reactor was divided into two zones of approximately equal volume by means of a baffle attached to the stirrer shaft. During the operation of the reactor, initiator is added on demand at the top of each zone to maintain a predetermined temperature, with essentially all the heat generated being the heat of polymerization. By judicious choice of initiator, the temperature gradient in each zone can be maintained at approximately 25°F. (14°C.) or less.

In a control run made without an additive, ethylene gas at a temperature of 150°F. (65.6°C.) was introduced at a rate of 200 lb./hr. (90.7 kg/hr.) into the first zone of the reactor. A temperature of 325°F. (163°C.) was maintained by addition of a 3 percent initiator solution of t-butyl perneodecanoate in hexane. The temperature gradient in this zone was 16°F. (9°C.). The polymerization mixture passed into the second zone where the temperature was maintained at 460°F. (238°C.) by addition of a 1% solution of t-butyl perbenzoate in hexane. The temperature at the discharge outlet of the second zone cycled between 460°F. (238°C.) and 480°F. (245°C.). Octene-1 was fed into the top of the first zone at the rate of approximately 1140 ml./hr. to provide a resin having a melt index of 2 as determined by ASTM D1238-70. Conversion of monomer to polymer was approximately 16 percent.

A second run was made under identical conditions except that the 3,5-ditertiarybutyl-p-quinone ethide from Example 2 was fed to the reactor in the first (low temperature) zone at a level of 4 ppm per part of ethylene being fed to the reactor. The 3,5-ditertiarybutyl-p-quinone ethide was fed to the reactor as a 0.18 percent solution in hexane.

A third run was also made under identical conditions except that the 3,5-ditertiarybutyl-p-quinone ethide from Example 2 was fed to the reactor in the low temperature zone at a level of 1.6 parts per million parts of ethylene being fed to the reactor. The 3,5-ditertiarybutyl-p-quinone ethide was fed to the reactor as a 0.076 percent solution in hexane.

The three resins were converted into blown film and the haze, gloss and transparency of the blown film were measured. The results are set forth in Table I.

Table I

| Resin | Control | Run No. 2 | Run No. 3 |
|---|---|---|---|
| Level, Quinone ethide | zero | 4.0 | 1.6 |
| Haze[1] | 7.1 | 5.3 | 4.8 |
| Gloss[2] | 85 | 99 | 112 |
| Scattermaster Transparency[3] | | | |
| Maximum | 24 | 52 | 64 |
| Minimum | 16 | 33 | 48 |

[1] ASTM Method — D1003-59T
[2] ASTM Method — D523-62T
[3] ASTM Method — D1746-62T It will be noted that the haze of the resins made by the method of the invention is lower than the haze of the control resin. The gloss and transparency of the resin made by the method of the invention are superior to the corresponding values obtained with the control resin.

EXAMPLE 4

Example 3 was repeated except that the 3,5-ditertiarybutyl-p-quinone methide prepared in Example 1 was employed in lieu of the 3,5-ditertiarybutyl-p-quinone ethide. Comparable results were obtained in this experiment.

We claim:
1. In a continuous high pressure, free-radical initiated, mass process for preparing ethylene polymers; the improvement which consists essentially of feeding a quinone alkide to the polymerization zone in a minor amount sufficient to improve the optical properties of the ethylene polymer being produced, said quinone alkide having the formula:

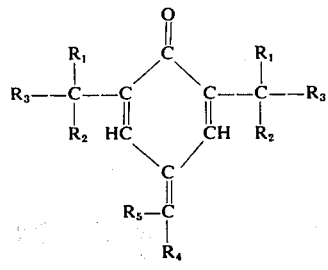

where $R_1$ and $R_2$ are alkyl groups, $R_3$ is an alkyl group or an aryl group, and $R_4$ and $R_5$ are hydrogen or an alkyl group.

2. The method of claim 1 in which the quinone alkide is 3,5-ditertiarybutyl-p-quinone methide.

3. The method of claim 1 in which the quinone alkide is 3,5-ditertiarybutyl-p-quinone ethide.

* * * * *